Inventor:
Kurt Meissner
By: Spencer & Kaye
Attorneys

United States Patent Office 3,582,426
Patented June 1, 1971

3,582,426
METHOD OF PROVIDING THE SURFACE OF AN OBJECT WITH AN ARTIFICIAL WOOD GRAIN PATTERN
Kurt Meissner, Berlin, Germany, assignor to Mikroholz Meissner & Co., KG, Berlin, Germany
Filed Mar. 28, 1968, Ser. No. 716,944
Int. Cl. B32b *31/12;* B41m *3/00*
U.S. Cl. 156—277  8 Claims

ABSTRACT OF THE DISCLOSURE

Means for and method of providing the surface of an object, such as a wooden, paperboard or metal panel, with a printed pattern, such as artificial wood grain. The means include an adhesive film which has a desired pattern printed on one side thereof. The method includes the steps of providing an adhesive film with a printed pattern and laminating a plastic sheet onto the surface of the object with the adhesive film.

BACKGROUND OF THE INVENTION

The present invention relates to a technique of applying a desired pattern to the surface of an object.

It is known in the art to print a desired pattern on the surfaces of objects, such as webs of paper, sheets of paperboard, cardboard, wood or metal or the like, which, for example, may be used for coverting or paneling ceilings, walls, doors, floors or any other articles. After being printed such objects are often covered with a transparent plastic covering sheet such as polyvinyl chloride in order to protect the surfaces of the objects from external influences. The surfaces of the plastic covering sheets can be cleaned of dirt more easily than the surfaces of wood or paperboard, for example, which they cover, and these plastic covering sheets hardly ever wear out.

Instead of directly printing the desired pattern on the surface of the object to be covered with a plastic covering sheet, it is also known to print the pattern on the inner face of the covering sheet itself, before it is applied with pressure and heat to the surface of the object. Because the plastic covering sheet softens during the pressing operation, the printed pattern will, in fact, run somewhat; this need not be a disadvantage, however, if, for example, it is desired to obtain the appearance of wood grain, since the lines of a genuine wood grain are not always sharply defined.

It has nevertheless been found that the adhesive ability of the covering sheet depends to a very great extent on the selection of the plastic material. There are plastic materials which are particularly desirable because of their strength and necessary transparency but which do not ensure adequately firm adhesion without the use of a separate adhesive. In addition, it is only possible to print finished plastic covering sheets of a limited size because their dimensions depend upon the size of the surface of the printing press.

If it is desired to print relatively long lengths of plastic covering sheets using a printing cylinder, the sheet can stretch under the printing cylinder, becoming thinner at that point so that, insofar as the film partially contracts again after the printing operation, successive printed patterns might become uneven. Furthermore, if it were desired to provide plastic covering sheets of different thicknesses with the same pattern, each covering sheet would have to be printed separately.

SUMMARY OF THE INVENTION

An object of the present invention, therefore, is to provide a means and a method of surfacing an object with a printed pattern, such as an artificial wood grain, which permits the lamination of the surface of the object with a plastic covering sheet but which obviates the disadvantages known in the prior art.

This, as well as other objects which will become apparent in the discussion that follows, may be achieved, according to the present invention, by providing an adhesive film which is suitable for use in surfacing objects with a printed pattern on one side thereof. This adhesive film may then be used to laminate plastic sheets onto the surface of the object.

One particular embodiment of the present invention includes a method of surfacing an object using the adhesive film described above. The method includes the steps of providing the adhesive film with a printed pattern and laminating the plastic sheet onto the surface of the object with the adhesive film.

Another particular embodiment of the present invention includes the object itself which has been surfaced according to the method described above.

And still another particular embodiment of the present invention includes a laminate comprising an object to be surfaced, the adhesive film, provided with a printed pattern, arranged so that one side adheres to the surface of the object and a plastic sheet arranged to adhere to the other side of the adhesive film.

DESCRIPTION OF THE PREFERRED EMBODIMENTS

Figure 1:
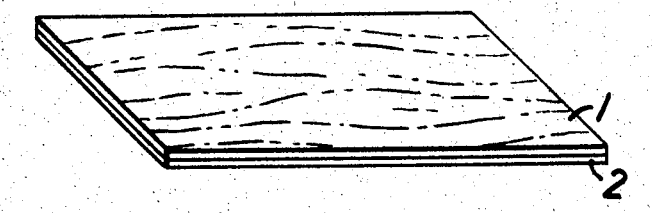
FIG. 1 is a perspective view of a wood veneer without a pronounced grain which is to be surfaced according to the present invention.

Referring now to the drawings, FIGS. 1, 2, 3 and 4 illustrate the adhesive film, the method of surfacing, and the laminate surface according to the preferred embodiments of the present invention. FIG. 1 shows a veneer 1 without a pronounced wood grain which is laminated onto a flexible base 2, for example, of paper. It is intended to surface this veneer in such a way that the resulting finish will have the appearance of distinct, genuine wood grain. It is to be understood, however, that the invention is not limited to the surfacing of wood. Any desired pattern may be added to the surface of a solid object whether the object be made of wood, paperboard, metal, or any other material.

Figure 2:
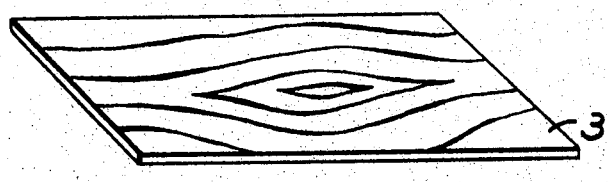
FIG. 2 is a perspective view of an adhesive film having a printed pattern on one side thereof according to the present invention.

The adhesive film to be used in surfacing the particular object shown in FIG. 1, the veneer 1, is illustrated in FIG. 2. This adhesive film 3 can be of any known composition suitable for holding the particular type of plastic sheet to the surface of the particular object. If, for example, the plastic sheet is made of polyvinyl chloride and the object is made of wood, the adhesive film may be polyvinyl chloride. Polyvinyl chloride may also be glued to paperboard with polyvinyl chloride or to metal with polyvinyl chloride.

The thickness of the adhesive film is also determined by the type of material comprising the plastic covering sheet and the object to be surfaced as well as the material of the adhesive film itself. In the examples given above where the plastic covering sheet is made of polyvinyl chloride the thicknesses may take the following ranges:

TABLE I

| Object to be surfaced | Adhesive | Thickness of the adhesive film (range), mm. |
|---|---|---|
| Wood | Polyvinyl chloride | 0.08-0.12 |
| Paperboard | do | 0.03-0.05 |
| Metal | do | 0.03-0.05 |

The adhesive film can, for example, be produced by coating a web of paper provided with a silicone layer with the adhesive material on the silicone side, allowing the adhesive to dry, and peeling the adhesive film off the silicone paper. The desired pattern can then be printed onto the adhesive film either before or after it has been removed from the silicone paper.

The use of a printed adhesive film has the advantage that the film can be manufactured in long webs, just like a thinly pared veneer with a paper backing as is shown in FIG. 1. It is therefore possible, for example, to produce a laminate composed of the thinly pared veneer with the backing of paper and the printed adhesive film. This laminate can be supplied in large stacks or wound into rolls ready for the last operation of pressing on the plastic covering sheet.

The adhesive film, according to the present invention, which is provided with a specific printed pattern can be used for plastic covering sheets of different thicknesses. It may be seen, therefore, that the possible applications of the adhesive film according to the present invention are extensive.

Figure 3:
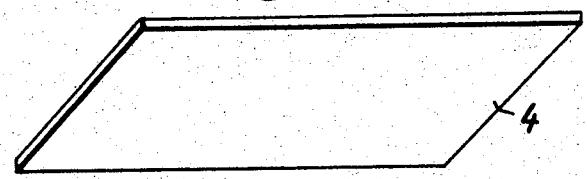
FIG. 3 is a perspective view of a transparent plastic covering sheet which is to be applied to the surface of the veneer of FIG. 1.

FIG. 3 shows a plastic covering sheet 4 which is to be applied to the veneer 1 by means of the adhesive film 3. As mentioned above, this covering sheet may, for example, be made of polyvinyl chloride. The covering sheet is joined together with the sheets illustrated in FIGS. 1 and 2 to form the laminate shown in FIG. 4. If, for example, the grain of the veneer 1 is less pronounced, as illustrated in FIG. 1, and the adhesive film 3 is printed with the pattern of a genuine veneer grain as illustrated in FIG. 2, the laminate consisting of the veneer 1 applied to a paper backing 2, the adhesive film 3 and the plastic covering sheet 4 will give the impression of a genuine veneer covered by a plastic material.

In order to achieve the most genuine wood grain appearance, it is preferable that the adhesive film be laminated with its printed side facing the object to be surfaced.

Figure 4:
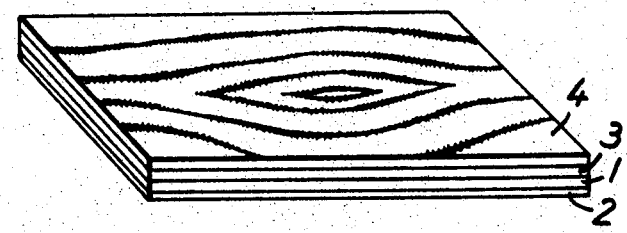
FIG. 4 is a perspective view of the veneer of FIG. 1 which has been surfaced according to the present invention.

The plastic covering sheet is laminated to the veneer 1 and the adhesive film 3 by pressing. The adhesive film actually softens slightly during the pressing operation so that the sharp outlines of the printed pattern become somewhat diffused as shown in FIG. 4. This effect actually makes the printed grain appear more genuine.

The strongest bond between the plastic covering sheet and the object to be surfaced may be obtained only by heating the adhesive. The amount of heat necessary will depend upon the particular adhesive. The adhesive set forth in Table I above should best be heated to 100° C.

The pressing operation easily lends itself to automation. The veneer material can be manufactured in long webs, then cut in strips or rolled into rolls for transportation and storage.

Although the invention has been described with reference to a thinly cut veneer devoid of a pronounced grain to which has been applied the pattern of a genuine veneer, it will be understood that the present invention is not limited to this description and application. Rather, the present invention is susceptible to various modifications, changes and adaptations and the same are intended to be comprehended within the meaning and range of equivalents of the appended claims.

What is claimed is:

1. A method for providing the surface of an object with an artificial wood grain pattern, comprising the steps of printing an artificial wood grain pattern onto a transparent thermoplastic solid film, and bonding a transparent plastic covering sheet to the surface of the object using the thus-printed film, the bonding including the application of heat and pressure for rendering the thus-printed film adhesive and for adhering the thus-printed film to and between the said transparent plastic covering sheet and the object to serve as a bonding material.

2. The method defined in claim 1 wherein said object is made of a material selected from the group consisting of wood, paperboard and metal.

3. The method defined in claim 1, wherein the step of bonding comprises heating solely the thermoplastic solid film to an adhesive state and pressing together the plastic covering sheet, said film and the object.

4. The method defined in claim 1, the step of bonding including the step of placing the printed side of said film in contact with said object.

5. The method defined in claim 1, wherein the object is a wood veneer and the thermoplastic solid film is polyvinyl chloride.

6. The method defined in claim 5, the step of bonding including the step of placing the printed side of said film in contact with said object.

7. The method defined in claim 1 wherein said plastic covering sheet is polyvinyl chloride.

8. The method defined in claim 7, wherein the object is a wood veneer and the thermoplastic solid film is polyvinyl chloride, and wherein the step of bonding comprises heating solely the thermoplastic solid film to an adhesive state and pressing together the plastic covering sheet, said film and the object.

References Cited

UNITED STATES PATENTS

| 2,759,866 | 8/1956 | Seymour | 156—277X |
| 3,372,674 | 9/1966 | Sachs et al. | 156—306X |
| 3,452,861 | 7/1969 | Erwin | 161—5X |
| 3,462,329 | 8/1969 | Beyer | 156—277X |
| 3,503,831 | 3/1970 | Oyama | 161—6 |
| 3,509,001 | 4/1970 | Shanok et al. | 161—5 |
| 3,051,598 | 8/1962 | Chipman et al. | 161—218X |
| 3,157,561 | 11/1964 | Miller et al. | 161—413X |
| 3,287,203 | 11/1966 | Elmendorf | 161—251X |
| 3,323,977 | 6/1967 | Hood | 161—56 |
| 3,490,969 | 1/1970 | Schiff | 161—251X |
| 2,804,416 | 8/1957 | Phillipsen | 161—218X |
| 2,956,915 | 10/1960 | Korn et al. | 161—251X |
| 2,987,103 | 6/1961 | Yakubik | 161—413X |
| 3,022,207 | 2/1962 | Lang | 161—251X |

FOREIGN PATENTS 953,752 4/1964 Great Britain.

HAROLD ANSHER, Primary Examiner

U.S. Cl. X.R.

156—309; 161—56, 97, 138, 218, 251, 413